United States Patent
Lee et al.

(10) Patent No.: US 6,740,300 B1
(45) Date of Patent: May 25, 2004

(54) METHOD FOR MANUFACTURING CRYSTALLINE LAYERED SODIUM DISILICATE

(75) Inventors: Jung Min Lee, Daejeon (KR); Jeong Kwon Suh, Daejeon (KR); Soon Yong Jeong, Daejeon (KR); Chun Hee Park, Seoul (KR); Jeong Hwan Park, Daejeon (KR); Jong Ah Kim, Daejeon (KR)

(73) Assignee: Korea Research Institute of Chemical Technology, Daejeon (KR)

( * ) Notice: Subject to any disclaimer, the term of this patent is extended or adjusted under 35 U.S.C. 154(b) by 0 days.

(21) Appl. No.: 09/762,435

(22) PCT Filed: Dec. 24, 1998

(86) PCT No.: PCT/KR98/00462

§ 371 (c)(1),
(2), (4) Date: Apr. 10, 2001

(87) PCT Pub. No.: WO00/09444

PCT Pub. Date: Feb. 24, 2000

(30) Foreign Application Priority Data

Aug. 14, 1998 (KR) ............................................. 98/32993

(51) Int. Cl.⁷ ............................. C01B 33/32; B01J 6/00
(52) U.S. Cl. ..................... 423/332; 423/333; 423/326
(58) Field of Search ................................ 423/325, 332, 423/333, 334, 326

(56) References Cited

U.S. PATENT DOCUMENTS

| | | | | |
|---|---|---|---|---|
| 3,208,822 A | * | 9/1965 | Baker et al. | 428/404 |
| 3,377,134 A | * | 4/1968 | Baker et al. | 423/332 |
| 5,211,930 A | | 5/1993 | Schimmel et al. | 423/333 |
| 5,215,732 A | * | 6/1993 | Hachgenei et al. | 423/334 |
| 5,567,404 A | | 10/1996 | Lee et al. | 423/332 |

FOREIGN PATENT DOCUMENTS

KR  97-033207  2/1999

* cited by examiner

Primary Examiner—N. M. Nguyen
(74) Attorney, Agent, or Firm—Finnegan, Henderson, Farabow, Garrett & Dunner, L.L.P.

(57) ABSTRACT

The present invention relates to an improved method for manufacturing a crystalline layered sodium disilicate and more particularly, to the improved method for manufacturing the crystalline layered sodium disilicate comprising the steps including the preparation of granules in a certain ratio of anhydrous sodium silicate cullet, a starting material, in the presence of some binders such as water and an aqueous solution of sodium silicate, followed by a crystallization step of the granules, thus ensuring that a small amount of final product is recycled to the prior crystallization step in order to prevent the attachment of granules to an inner crystallization device, which occurs due to local sintering in a high-temperature crystallization condition of continual process and also to further enhance the unit productivity during the mass production of crystalline layered sodium disilicate.

4 Claims, 1 Drawing Sheet

METHOD FOR MANUFACTURING CRYSTALLINE LAYERED SODIUM DISILICATE

BACKGROUND OF THE INVENTION

1. Field of the Invention

Figure 1:
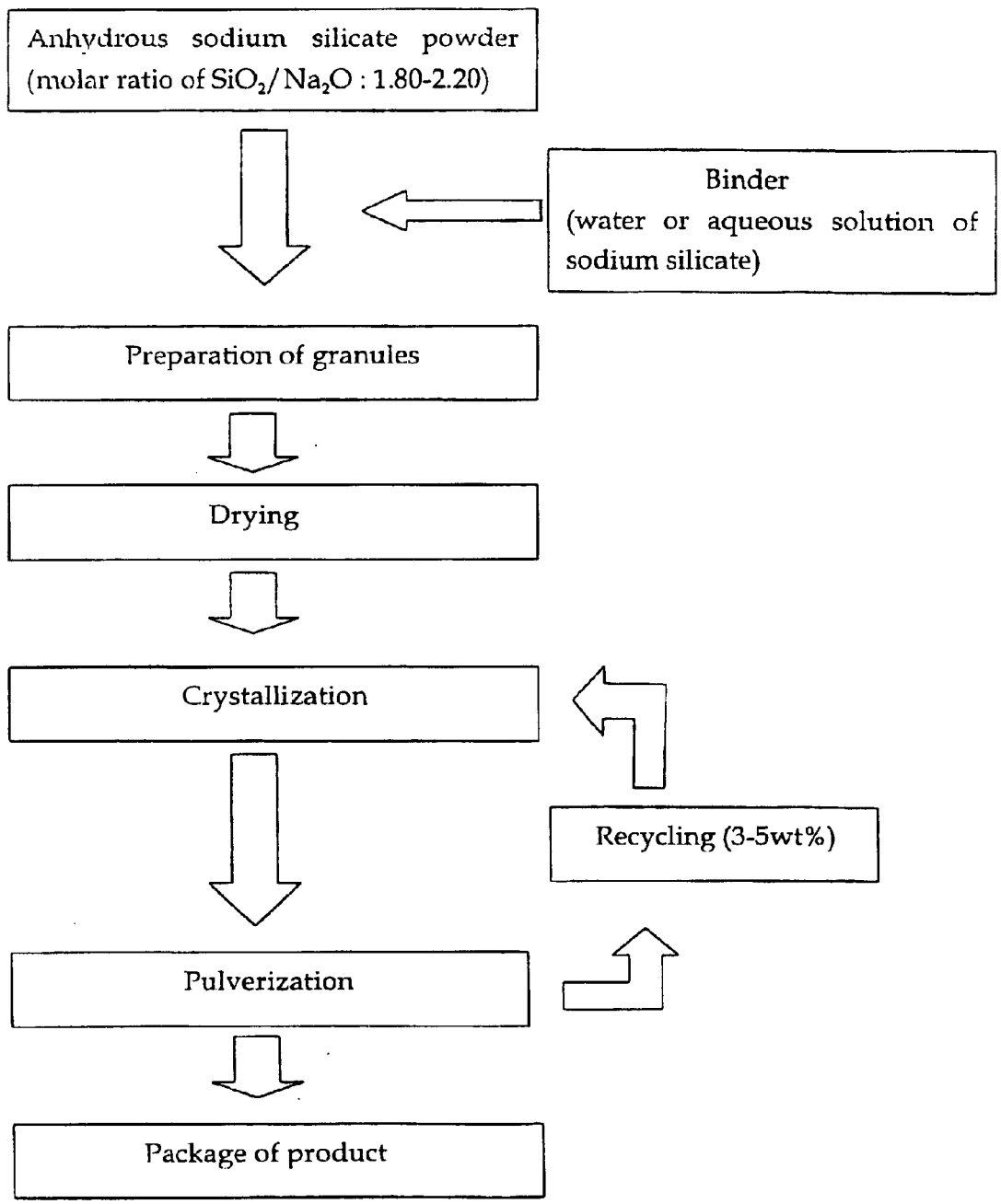

The present invention relates to an improved method for manufacturing a crystalline layered sodium disilicate and more particularly, to the improved method for manufacturing the crystalline layered sodium disilicate comprising the steps including the preparation of granules in a certain ratio of anhydrous sodium silicate cullet, a starting material, in the presence of some binders such as water and aqueous solution of sodium silicate, followed by a crystallization step of the granules, wherein a small amount of final product is recycled to the prior crystallization step in order to prevent the attachment of granules to an inner crystallization device, which occurs due to local sintering in a high-temperature crystallization condition of continual process and also to further enhance the unit productivity during the mass production of crystalline layered sodium disilicate.

2. Description of the Related Art

The term "cullet" used as a starting material of this invention, which has been frequently used as a raw material in a field involved in the manufacture of sodium silicate solution, refers to a compound in a small lump or piece derived from amorphous sodium silicate, prepared in such a manner that a mixture of silica and sodium carbonate in an appropriate molar ratio (ratio of $SiO_2O$, to $Na_2O$, namely $SiO_2/Na_2O$) is heated at the temperature of 1000–1400° C., melted and cooled.

In addition, the term "layered sodium silicate" refers to crystalline silica compounds expressed by "$(Na_2O)_x(SiO_2)_y$" (where y/x varies differently depending on the crystal structure and has the common values ranging from 2 to 11); among them, the crystalline layered sodium silicate expressed by $Na_2Si_2O_5$ is reported to have various crystal forms such as α, β, γ and δ-phases and with its excellent adsorptivity and ion-exchange capacity originated from structural specificity, the crystalline layered sodium disilicate has been useful as a catalytic carrier or in a variety of chemical processes such as separation and purification. With its higher binding capacity on the hardness components in water such as $Ca^{2+}$ and $Mg^{2+}$ in particular, the crystalline layered sodium disilicate in δ-phase, the crystalline layered sodium disilicate has been recently used as a water softener or detergent composition builder.

However, the process for manufacturing the crystalline layered sodium disilicate in δ-phase has recognized some disadvantages in that severe foaming induced by a leakage of remaining water is generated in the initial crystallization step, and with sintering and shrinkage of particles, they are deposited in the crystallization device.

To comply with this matter, U.S. Pat. No. 5,211,930 has added a method for recycling 10–50 wt % of final product to the crystallization step, thus preventing deposit of products in a calcination device.

However, the above method has proven to be uneconomical with poor unit productivity during mass production, since a large amount (10–5 wt %) of final product is recycled to the device; the reduction of unit productivity cannot be overcome in a process where powders containing a large amount of water is fed.

Under such circumstances, in an effort to prevent the deposits of final product in the crystallization device, the inventor et al. in their respective patents (U.S. Pat. No. 5,567,404, its corresponding Korea Patent No. 13997 and Korea Patent Appln. No. 97-33207) have disclosed some methods for manufacturing the crystalline layered sodium disilicate in such a manner that water or aqueous solution of sodium silicate in a small amount for agglomeration is added to a cullet powder, a starting material, thereby preparing granules with a small amount of water and then the granules are crystallized in calcination furnace, thus ensuring more simplification of manufacturing process, reduction in energy consumption, and removal of deposits remaining in the device. Notwithstanding this, these methods have still failed to eliminate the deposits of some granules in the device during the crystallization step, when a continual process for mass production is operated.

SUMMARY OF THE INVENTION

To overcome the aforementioned shortcoming that reactants are deposited in a crystallization device, the inventor et al. have found that a process recycling a small amount of final product to the device may not only eliminate the deposit of product in a calcination furnace associated with local sintering occurring at a higher temperature during continual process, but also recycle less amount than that of the U.S. Pat. No. 5,211,930, thus resulting in significant increase of unit productivity during mass production. In consequence, the inventor et al. have completed this invention.

Therefore, an object of this invention is to provide an improved method for manufacturing a crystalline layered sodium disilicate, being characterized in that some defects found in the crystallization device have been completely removed by specifying the agglomeration and recycling steps for possible continual process, thereby improving unit productivity during mass production.

DETAILED DESCRIPTION OF THE INVENTION

This invention is characterized by an improved method for manufacturing crystalline layered sodium disilicate comprising the subsequent steps of a) preparing granules with the addition of water as binder to anhydrous sodium silicate cullet powder; b) drying and crystallizing the granules by heat calcination to prepare sodium disilicate, wherein 3–5 wt % of final product, sodium disilicate, is recycled to the prior crystallization step.

Also, this invention is characterized by an improved method for manufacturing the crystalline layered sodium disilicate comprising the subsequent steps of a) preparing granules with the addition of an aqueous solution of sodium silicate as binder to anhydrous sodium silicate cullet powder; b) drying and crystallizing the granules by heat calcination to prepare sodium disilicate, wherein 3–5 wt % of final product, sodium disilicate, is recycled to the prior crystallization step.

This invention is explained in detail as follows:

This invention relates to a method for manufacturing a crystalline layered sodium disilicate, performed in such subsequent steps that a certain amount of water or aqueous solution of sodium silicate is added to an anhydrous sodium silicate cullet powder comprising a certain ratio of chemical composition for the preparation of granules, followed by drying and calcining for their crystallization, wherein a step of recycling some final products to the crystallization device has contributed much to settlement of several problems associated with the continual operation, since the recycling process makes it possible to separate the reactants, which may be sintered in the device at a high temperature (500–800° C.), from inner wall of the crystallization device. According to this invention, the recycling step of final product in small amounts is available in that from the step of preparing granules, the round-form agglomeration may minimize the contact area in the crystallization device.

As described in the respective patents (U.S. Pat. No. 5,567,404, its corresponding Korea Patent No. 139976 and Korea Patent Appln. No. 97-33207) disclosed by the inventor et al, the agglomeration step highlighted by this invention, which has several advantages in that a) unlike the conventional method with crystallization process for powder material, high-density materials supplied to crystallization device may cause no dust with a higher unit productivity; b) minimization of contact area with the device due to agglomeration may significantly prevent any attachment caused by the sintering of reactants. However, the manufacturing method using the agglomeration step has failed to efficiently prevent the attachment of reactants to the inner wall of calcination device during mass production of continual operation.

To efficiently prevent the attachment of granules to the device, a small amount of final product (less than 5 wt %) is recycled to separate the reactants sintered from inner wall of the crystallization device.

The process for manufacturing a crystalline layered sodium disilicate of this invention is briefly illustrated in FIG. 1 and each process step is explained in more detail as follows:

First, a cullet (the molar ratio of $SiO_2$ to $Na_2O$ is 1.80–2.20) is pulverized to make a cutlet powder having less than 0.8 mm ($D_{50} \approx 0.3$ mm) in its particle size;

Second, water and aqueous solution of sodium silicate (the molar ratio of $SiO_2$ to $Na_2O$ used as a binder is 2.0–3.3, solid content: 15–40 wt %) is added to the cullet powder to prepare a granule having 1–30 mm (volumetric density: 1.1–1.6 g/cm) in its diameter; hence, the water used for the agglomeration of cullet powder acts not only as a binder, but also as an indispensable component for the phase transfer due to hydration. In view of the fact that the manufacturing conditions for granules vary differently depending upon the amount of water, water may be directly used but the use of aqueous solution of sodium silicate may enhance the adhesive power of solid component in the binder composition of cullet powder, thus making it easier to adjust the amount of water.

It is preferred that 5–30 wt % of water is added to an anhydrous sodium silicate cullet powder, when water is directly used as a binder. Further, it is preferred that an aqueous solution of sodium silicate containing 15–40 wt % of solid component is used as a binder for the adjustment of water contents; the amount of sodium silicate in aqueous solution is in the range of 10–30 wt % to the anhydrous sodium silicate cullet powder.

Hence, the agglomeration device includes any type of agglomeration device such as a round type, a cylindrical type, fluidized type and molding press.

Then, the step of drying the granules is performed, followed by calcination to finally prepare the crystalline layered sodium disilicate.

According to this invention, granules are subjected to a drying step before it is delivered to a continual calcination device, since such drying step may effectively prevent the combining of granules induced by the adhesiveness of aqueous solution of sodium silicate present in the surface of granules, while making it easier not only to deliver the granules, but also to form the phase variation during crystallization by facilitating the hydration in the granules.

However, the drying step at extremely high temperature is responsible for generation of any impurities, thus reducing the purity of final product. In this respect, it is preferred that the drying step is performed at 80–200° C. until the amount of evaporated water becomes 0.2–1.0 wt %. The volumetric density of the granules, so dried, should be maintained at 1.1–1.6 g/cm.

The granules are placed at a rotary calcination furnace, crystallized for 0.1–1 hour at 650–800° C. to form a material with 0.1–0.5 g/cm of volumetric density, and pulverized with a crusher.

Meantime, the recycling step highlighted by this invention is to re-supply some of final product to a crystallization device, together with dried granules. Hence, the particle size of final product for recycling is of little significance but the step of recycling some micropowders may cause the occurrence of dusts, which will result in heavy load to a bag filter during continual operation. Therefore, it is preferred that the particle size of final product for recycling is in the range of 0.2–1.0 mm ($D_{50} \approx 0.6$ mm).

The recycling step using a larger amount of final product is advantageous in preventing any attachment or formation of mass in the device but this may adversely affect the unit productivity. To achieve the objective of this invention, therefore, a priority should be given to the limitedness of the recycling amount of final product. Therefore, the recycling amount of final product is less than 5 wt % at maximum in proportion to the total amount of granule, preferably 3–5 wt %. Hence, if the recycling amount is less than 3 wt %, a sintering occurs in some granules which are momentarily attached to or detached from the inner wall of a calcination furnace, or a mass of granules is formed or sintered. At this time, the α-type crystal phase occurs partially in the final product.

Further, if the recycling amount of final product exceeds 5 wt %, the individual rotation of granules impedes their swift delivery, when contacted with an excessive recycling amount of final product during the crystallization. Under such circumstances, any retention time of granules cannot be constantly maintained in addition to possible occurrence of dusts and furthermore, the unit productivity becomes significantly reduced thereto.

As such, the product prepared by recycling an appropriate amount of final product exhibits an excellent physical property as a δ-phase crystalline layered sodium disilicate in high purity.

The salient points relating to the process for manufacturing a crystalline layered sodium disilicate of this invention may be summarized as follows:

First, the homogeneous crystallization of granules may be ensured by recycling a small amount of final product together with granules, and the coagulation of granules and the inner wall of the device due to local sintering during crystallization may be prevented by the recycling powder.

Second, since the attachment of granules in the device may be prevented, the continual process is available and by recycling a small amount of final product, a higher unit productivity may also lead to an optimization of the process thereto.

This invention is explained in more detailed based on the following examples but is not limited by these examples.

EXAMPLE 1

5 kg of a cullet powder (molar ratio of $SiO_2/Na_2O$:2.03, particle size: $D_{50} \approx 0.3$ mm) was placed at a hopper for raw material, and transferred to a round-type agglomeration device at a speed of 60 g/min (ψ40 cm, Yongjin Machinery Co. of Korea). While rotating the material at 15 rpm with an angle of inclination at 48°, aqueous solution of silicate sodium having the molar ratio of 2.26 in $SiO_2/Na_2O$ (solid content: 30 wt %, Shinhoong Silicate Product of Korea) was added dropwise at 13 g/min to give granules. Then, the granules in round form having about 8 mm in its average diameter were continuously obtained.

The granules dried by a air flow oven at 120° C., for 30 mins (amount of evaporated water: 0.5 wt %, volumetric density: 1.31 g/cm'), were placed at a hopper for raw material in a rotary calcination furnace (ψ20 cm×l 300 cm, Dong-A Heavy Industries of Korea), and transferred to a calcination furnace (feeding rate by a vibration feeding device: 200 g/min) at 725° C., together with the amount, indicated in Table 1, of final pulverized product for recycling at a speed of 6 g/ min. Hence, the reactant was crystallized at the retention time of 20 mins with the angle of inclination at 0.5° and at 8 rpm.

During such crystallization, any attachment of reactant to the inner device was not observed. Then, a whitish porous crystalline layered sodium disilicate with the expanded volumetric density of about 0.26 g/cm' was obtained, while keeping the initial granule form via appropriate rotational operation of individual granules.

EXAMPLE 2

The granules prepared in the same manner as Example 1 was transferred to a calcination furnace at a speed of 200 g/min, together with the amount, indicated in Table 1, of final pulverized product for recycling at a speed of 10 g/min. Then, a crystalline layered sodium disilicate was prepared in the same manner as Example 1. During such process, any attachment of reactant to the inner device was not observed.

Comparative Example 1

The granules prepared in the same manner as Example 1 were transferred to a calcination furnace at a speed of 200 g/min, while any final product for recycling was not added. Then, a crystalline layered sodium disilicate was prepared in the same manner as Example 1. During the manufacturing process, some reactants was momentarily sintered and attached to an inner wall of calcination device. The formation of mass or attachment among some granules were observed.

Comparative Example 2

The granules prepared in the same manner as Example 1 were transferred to a calcination furnace at a speed of 200 g/min, together with the amount, indicated in Table 1, of final pulverized product for recycling at a speed of 200 g/min. Then, a crystalline layered sodium disilicate was prepared in the same manner as Example 1. Dusts were generated in the process of supplying the raw materials and individual rotation of granules were insufficiently made due to recycling of final product in excess amount.

Experimental Example 1: Attachment of Granules in the Calcination Device

The attachment of granules in the calcination device was observed with naked eye at the tube end of crystallization device. The results were shown in the following Table 1.

Experimental Example 2: Measurement for the Binding Capacity of Final Product to Hardness Component The final products prepared from Examples 1–2 and Comparative example 1–2 was pulverized by ball-mill for 30 minutes and classified to make the particle size of 43–104 μm. Then, the binding capacity to $Ca^{2+}$ and $Mg^{2+}$ was measured in the following manner.

(1) Measurement for the Binding Capacity to $Ca^{2+}$

About 1.0 g of sample was weighed, transferred to a stirrer at 25° C. and then, 1000 ml of hard water (aqueous solution of $Ca^{2+}$, hardness: 200 $mgCa^{2+}/l$) was added to the sample. The mixture was stirred for 15 minutes and filtered off immediately. 25 ml of the remaining solution, accurately collected, was transferred to a 100 ml Erlenmeyer flask, followed by the addition of 2–3 ml of $NH_3$—$NH_4Cl$ buffer solution (pH 10). E.B.T indicator was added to the mixture, and titrated with a standard solution of 0.01M EDTA. Then the binding capacity to $Ca^{2+}$ was calculated using the following equation 1.

$$\text{Binding capacity to } Ca^{2+}(mgCa^{2+}/g)=[12.5-(t \times f)/w] \times (200/12.5) \qquad \text{Equation 1.}$$

Where, t is a consumption amount of EDTA (ml), w is a weight of sample(g); and f is a factor of EDTA solution used.

(2) Measurement for the Binding Capacity to $Mg^{2+}$

About 1.0 g of sample was weighed, transferred to a stirrer at 25° C. and then, 1000 ml of hard water ($Mg^{2+}$ solution, hardness: 120 $mgCa^{2+}/l$) was added to the sample. The mixture was stirred for 15 minutes and filtered off immediately. 25 ml of the remaining solution, accurately collected, was transferred to a 100 ml Erlenmeyer flask, followed by the addition of potassium cyanide solution (10%) 0.5 ml, several drops of hydroxychloride ammonium solution (10%) and 2–3 ml of $NH_3$—$NH_4Cl$ buffer solution (pH 10). E.B.T indicator was added to the mixture, and titrated with a standard solution of 00.1M EDTA. Then, the binding capacity to $Mg^{2+}$ was calculated using the following equation 2.

$$\text{Binding capacity to } Mg^{2+}(mgMg^{2+}/g)=[12.5-(t \times f)/w] \times (120/12.5) \qquad \text{Equation 2.}$$

Where, t is a consumption amount of EDTA (ml); w is a weight of sample(g); and f is a factor of EDTA solution used.

TABLE 1

| Category | Product for recycling Recycling amount (wt %) | Average particle size (D50, mm) | Attachment in calcination device | Binding capacity in terms of hardness $Ca^{2+}$ (mg $Ca^{2+}$/g) | $Mg^{2+}$ (mg $Mg^{2+}$/g) |
|---|---|---|---|---|---|
| Examp. 1 | 3 | 0.6 | Not attached | 109.7 | 91.2 |
| Examp. 2 | 5 | 0.6 | Not attached | 112.5 | 92.4 |
| Comp. examp. 1 | 0 | — | Attached partially or mass-formed | 97.3 | 76.7 |
| Comp. examp. 2 | 10 | 0.6 | Not attached but unavailable in swift rotation | 107.3 | 89.2 |

As mentioned above, this invention relates to a method for manufacturing the crystalline layered sodium disilicate comprising the steps including the preparation of granules from an anhydrous sodium silicate cullet with the addition of some binders such as water and aqueous solution of sodium silicate, followed by a crystallization process of the granules, thus ensuring that a small amount of final product is recycled to the prior crystallization step in order to prevent the attachment of granules to an inner crystallization device, which occurs due to local sintering in a high-temperature crystallization condition of continual process and also to further enhance the unit productivity during the mass production of crystalline layered sodium disilicate. Further, the crystalline layered sodium disilicate prepared by this invention has an excellent physical property, when the granules are crystallized.

What is claimed is:

1. A process for manufacturing crystalline layered sodium disilicate comprising the steps of a) preparing granules with the addition of water as binder to anhydrous sodium silicate cullet powder; and b) drying and crystallizing the granules by calcination to prepare sodium disilicate, wherein 3–5 wt % of final product, sodium disilicate, is recycled to the prior crystallization step.

2. The process for manufacturing crystalline layered sodium disilicate according to claim 1, wherein the water as said binder component is added to the anhydrous sodium silicate cullet powder in the range of 5–30 wt %.

3. The process for manufacturing crystalline layered sodium disilicate according to claim 1, wherein the crystallization step is performed at 650–800° C.

4. A process for manufacturing crystalline layered sodium disilicate comprising the steps of a) preparing granules with the addition of an aqueous solution of sodium silicate as binder to anhydrous sodium silicate cullet powder; and b) drying and crystallizing the granules by calcination to prepare sodium disilicate, wherein 3–5 wt % of final product, sodium disilicate, is recycled to the prior crystallization step.

* * * * *